(12) United States Patent
Ueno et al.

(10) Patent No.: US 8,064,298 B2
(45) Date of Patent: Nov. 22, 2011

(54) RECORDING MEDIUM REPRODUCING DEVICE, A METHOD FOR REPRODUCING A RECORDING MEDIUM, A PROGRAM FOR REPRODUCING A RECORDING MEDIUM, AND A RECORDING MEDIUM

(75) Inventors: Yumi Ueno, Kawagoe (JP); Koji Watanabe, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 216 days.

(21) Appl. No.: 12/377,414

(22) PCT Filed: Aug. 30, 2006

(86) PCT No.: PCT/JP2006/317066
§ 371 (c)(1),
(2), (4) Date: Feb. 13, 2009

(87) PCT Pub. No.: WO2008/026262
PCT Pub. Date: Mar. 6, 2008

(65) Prior Publication Data
US 2010/0238775 A1   Sep. 23, 2010

(51) Int. Cl.
*G11B 7/085* (2006.01)
*G11B 15/02* (2006.01)
*G11B 11/00* (2006.01)

(52) U.S. Cl. ............... 369/30.08; 369/30.04; 369/47.23; 369/53.31

(58) Field of Classification Search ............... 369/47.15, 369/53.2; 386/351, 343, 323
See application file for complete search history.

(56) References Cited

U.S. PATENT DOCUMENTS

2005/0094987 A1* 5/2005 Suzuki .................... 386/125

FOREIGN PATENT DOCUMENTS

| JP | 2001-351312 A |   | 12/2001 |
|----|---------------|---|---------|
| JP | 2001351312 A | * | 12/2001 |
| JP | 2002-042449 A |   | 2/2002 |
| JP | 2002042449 A | * | 2/2002 |
| JP | 2002074908 A | * | 3/2002 |
| JP | 2003-045165 A |   | 2/2003 |
| JP | 2004-103207 A |   | 4/2004 |
| JP | 2005-135477 A |   | 5/2005 |

OTHER PUBLICATIONS

English translation of Japanese patent publication JP,2002-074908,A by Hashimoto.*
English translation of Japanese patent publication JP,2001-351312,A by Takemura.*
English translation of Japanese patent publication JP,2002-042449,A by Kushibe.*

* cited by examiner

*Primary Examiner* — Joseph Haley
*Assistant Examiner* — Nicholas Lee
(74) *Attorney, Agent, or Firm* — Sughrue Mion, PLLC

(57) ABSTRACT

Problems In a recording medium such as DVD, for example, when groups having the same title or the same song and different numbers of channels are recorded, all the groups are reproduced, further, when a DVD author mistakes, contents which are not needed to be reproduced are reproduced.
Means for Solving Problems In a case of DVD-Audio, a condition for reproducing a group having at least one track (a group having the longest reproducing time, a group having the largest number of tracks, a group having the largest data capacity) is set, and only the group which matches the condition is reproduced. In a case of DVD-Video, a title can be used instead of the group. In a case of CD, a folder is used instead of the group.

12 Claims, 4 Drawing Sheets

FIG. 4

| GROUP | 1 | | | 2 | | | 3 |
|---|---|---|---|---|---|---|---|
| TRACK | 1 | 2 | 3 | 1 | 2 | 3 | |
| TITLE NAME | AAA | BBB | CCC | AAA | BBB | CCC | DDD |
| REPRODUCING DATA | 2ch | | | 6ch | | | NO AUDIO |

FIG. 5

| TITLE | 1 | | | | | 2 | | |
|---|---|---|---|---|---|---|---|---|
| CHAPTER | 1 | 2 | 3 | 4 | 5 | 1 | 2 | 3 |
| TITLE NAME | MAIN1 | MAIN2 | MAIN3 | MAIN4 | MAIN5 | BONUS1 | BONUS2 | BONUS3 |
| REPRODUCING TIME | TWO HOURS | | | | | ONE HOUR | | |

FIG. 6

| TITLE | 1 | | | | 2 | 3 | 4 | 5 |
|---|---|---|---|---|---|---|---|---|
| CHAPTER | 1 | 2 | 3 | 4 | 1 | 1 | 1 | 1 |
| TITLE NAME | AAA | BBB | CCC | DDD | AAA | BBB | CCC | DDD |

FIG. 7

| FOLDER | 1 | | | 2 | | | 3 | |
|---|---|---|---|---|---|---|---|---|
| TRACK | 1 | 2 | 3 | 1 | 2 | 3 | 1 | 2 |
| TITLE NAME | AAA | BBB | CCC | DDD | EEE | FFF | GGG | HHH |

RECORDING MEDIUM REPRODUCING DEVICE, A METHOD FOR REPRODUCING A RECORDING MEDIUM, A PROGRAM FOR REPRODUCING A RECORDING MEDIUM, AND A RECORDING MEDIUM

Recording medium reproducing device, a method for reproducing a recording medium, a program for reproducing a recording medium, and a recording medium

TECHNICAL FIELD

This invention relates to a recording medium reproducing device, a method for reproducing a recording medium, a program for reproducing a recording medium, and a recording medium on which a plurality of contents such as audio and video are recorded.

BACKGROUND

Nowadays, a DVD (Digital Versatile Disc) is often used as a medium on which data such as audio and video is recorded. In the DVD, data is divided to a plurality of groups (or titles) to be recorded. In each group, a plurality of tracks (or chapters) is provided. The contents such as audio and video in each group are divided to a plurality of tracks in the group to be recorded.

Further, in a DVD-Audio or the like, the audio is allowed to be recorded multi-channel other than conventional two-channel, and allowed to be reproduced with a higher sound quality and a higher realistic sensation (for example, see Patent Document 1).

[Patent Document 1] Japanese Published Patent Application No. 2004-103207

DISCLOSURE OF THE INVENTION

Problem to be Solved by the Invention

The above-described two types of audio (two-channel and multi-channel) are respectively recorded as different groups. Control data is often so recorded that when one group is finished reproducing, a menu screen is displayed. Therefore, either of the two types of audio is often reproduced. However, for example, when an on-vehicle reproducing device is set for continuously reproducing the audio data, the two types of audio, namely, the same song having the same title is reproduced twice. Resultingly, a user is confused.

In particular, with regard to the on-vehicle device, because a user normally has to concentrate on driving, it is preferable that opportunities to operate the menu while reproducing are reduced as much as possible.

Further, when the reproducing device continuously reproduces only the audio data, a track of the control data such as the menu, or the contents such as a sound effect for operating the menu, which are not needed to be reproduced, are often reproduced due to a mistake of a DVD composer. In such a case, because a silent period is generated, or a nonsensical sound effect which is not music is reproduced, a nonsensical operation for a user is performed.

Accordingly, an object of the present invention is to provide a recording medium reproducing device, a method for reproducing a recording medium, a program for reproducing a recording medium, and a recording medium whereby when reproducing a recording medium on which a plurality of contents such as audio and video data are recorded, even if the same title or the same song is recorded more than once, the same title or the same song is not reproduced more than once, further, the contents which are not needed to be reproduced are not reproduced, and further, reproducing is continued without displaying a menu screen as much as possible.

Means for Solving Problem

For attaining the object, according to claim 1 of the present invention, there is provided a recording medium reproducing device including:

a readout unit for reading out recorded contents from a recording medium on which a plurality of groups in each of which at least one content is included are recorded;

a reproducing unit for reproducing the contents which are read out by the readout unit;

a condition setting unit for setting a condition for reproducing a group having the largest data capacity in the recording medium;

a selecting unit for selecting the group which matches the condition set by the setting unit from among the groups;

a control unit to make the readout unit read out the group selected by the selecting unit and to make the reproducing unit reproduce the group.

According to claim 5 of the present invention, there is provided a method for reproducing a recording medium for reading out and reproducing a recorded content from a recording medium on which a plurality of groups in each of which at least one content is included are recorded, said method including the steps of:

setting the condition for reproducing one group having the largest data capacity in the recording medium from among a plurality of groups;

selecting the group which matches the condition from among a plurality of groups;

reading out the group; and reproducing the group.

According to claim 6 of the present invention, there is provided a program for reproducing a recording medium to make a computer of a reproducing device for a recording medium having a readout unit for reading out contents from a recording medium on which a plurality of groups each of which includes at least one content are recorded work as a reproducing unit for reproducing the contents read out by the readout unit, wherein the program makes the computer work as:

a condition setting unit for setting a condition for reproducing a group having the largest data capacity in the recording medium;

a selecting unit for selecting the group which matches the condition set by the setting unit from among the groups;

a control unit to make the readout unit read out the group selected by the selecting unit and to make the reproducing unit reproduce the group.

BRIEF DESCRIPTION OF DRAWINGS

FIG. 4 An explanatory view of an example of entries in a DVD-Audio.

FIG. 5 An explanatory view of an example of entries in a DVD-Video (video data is recorded).

FIG. 6 An explanatory view of an example of entries in a DVD-Video (audio data is recorded).

FIG. 7 An explanatory view of an example of entries in a CD-Video when MP3 or WMA is recorded.

EXPLANATIONS OF LETTERS OR NUMERALS

Figure 1:
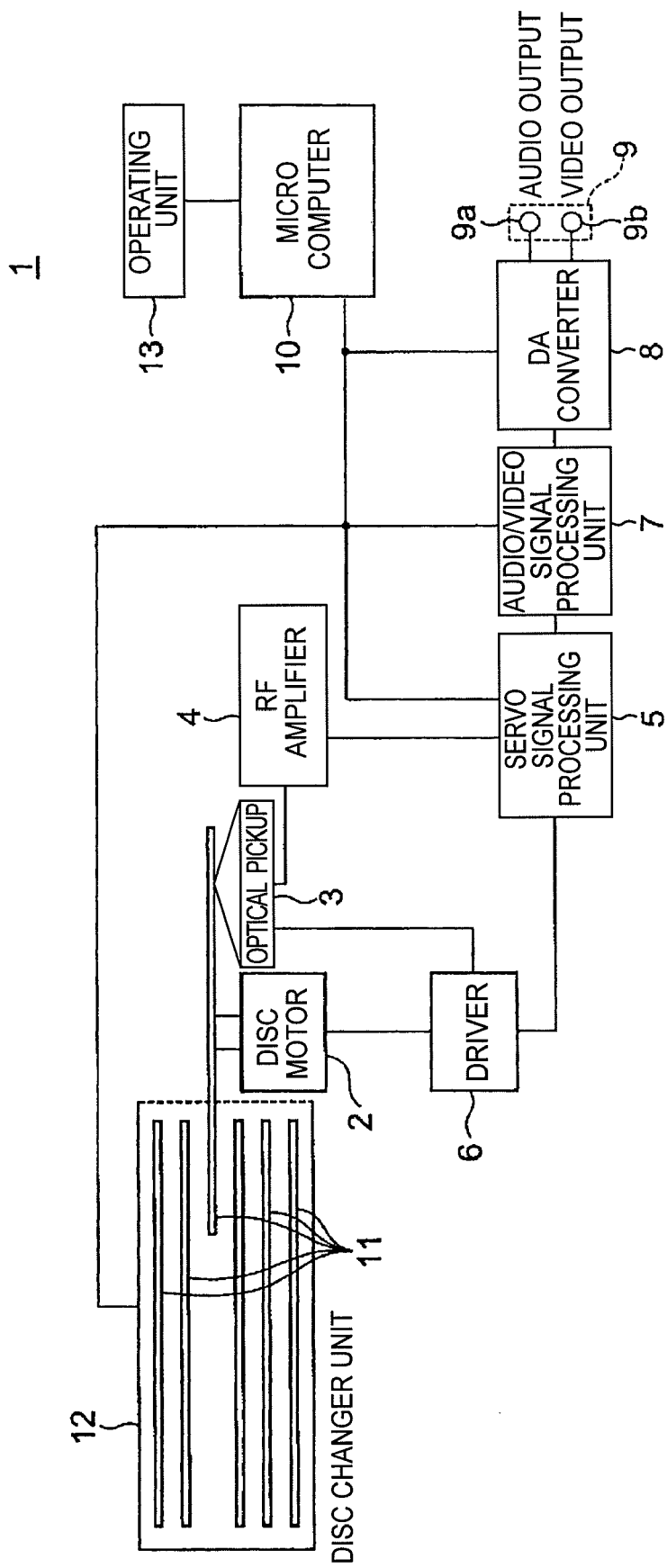
FIG. 1 A block diagram of an optical disc changer according to an embodiment of the present invention.

1 Optical disc changer (recording medium reproducing device)
3 Optical pickup (readout unit)
7 Audio/video signal processing unit (reproducing unit)
10 Microcomputer (selecting unit, control unit)
11 Optical disc (recording medium)
13 Operating unit (condition setting unit)
S1 Condition setting (condition setting unit)
S3 Reproducing the beginning of the track of the group which matches the condition set by (selecting unit, reproducing unit)

BEST MODE FOR CARRYING OUT THE INVENTION

Hereafter, a recording media reproducing device according to an embodiment of the present invention will be explained. In the recording media reproducing device according to this embodiment of the present invention, a condition setting unit sets a condition for reproducing a group having the largest data capacity in the recording medium, a selecting unit selects the group which matches the condition set by the condition setting unit, and a control unit makes a readout unit read out the group and makes a reproducing unit reproduce the group. Thus, because only the group having the largest data capacity in the recording medium which matches the predetermined condition set by a user is reproduced, it is avoided that the same tile or the same song is reproduced more than once, and the contents which are not needed to be reproduced are reproduced.

Further, a group having the longest reproducing time may be a condition set by the condition setting unit. Thus, because only the group having the longest reproducing time among the groups to be reproduced in the recording media is reproduced, it is avoided that the contents which are not needed to be reproduced are reproduced.

Further, a group having the largest number of contents may be a condition set by the condition setting unit. Thus, because only the group having the largest number of contents among the groups to be reproduced in the recording media is reproduced, it is avoided that the same tile or the same song is reproduced more than once, and the contents which are not needed to be reproduced are reproduced.

Further, the readout unit may read out the contents from an arbitrarily selected recording medium among a plurality of recording media. Thus, because a so-called changer function can be installed, in not only a reproducing device having a recording medium but also a changer for reproducing a plurality of recording media while changing the media, it is avoided that the same tile or the same song is reproduced more than once, and the contents which are not needed to be reproduced are reproduced.

Further, when the reproducing unit finishes reproducing at the end of the group selected by the selecting unit, the control unit may make the readout member select another recording medium, may make the selecting unit select the group based on the condition set by the condition setting unit with regard to the another recording medium, and may the reproducing unit reproduce the group. Thus, in the changer, when the reproducing of the group is finished, automatically, another disc is reproduced without displaying the menu screen. Therefore, the reproducing can be continued without displaying the menu or the like.

Further, when the reproducing unit finishes reproducing at the end of the group selected by the selecting unit, the control unit may make the reproducing unit reproduce the group again. Thus, when the reproducing of the group is finished, automatically, the group is reproduced again (so called reproducing repeatedly). Therefore, the reproducing can be continued without displaying the menu or the like.

Further, a method for reproducing a recording medium according to an embodiment of the present invention includes the steps of: setting a condition for reproducing a group having the largest data capacity in the recording medium; selecting the group which matches the condition set by among the groups; reading out the group; and reproducing the group. Thus, because only the group having the largest data capacity in the recording medium which matches a predetermined condition set by a user or the like is reproduced, it is avoided that the same tile or the same song is reproduced more than once, and the contents which are not needed to be reproduced are reproduced.

Further, a program for reproducing a recording medium according to an embodiment of the present invention makes a computer work including the steps of setting a condition for reproducing a group having the largest data capacity in the recording medium; selecting the group which matches the condition set by among the groups; reading out the group; and reproducing the group. Thus, because only the group having the largest data capacity in the recording medium which matches a predetermined condition set by a user or the like is reproduced, it is avoided that the same tile or the same song is reproduced more than once, and the contents which are not needed to be reproduced are reproduced. Further, because the program is executed by a computer, general versatility is increased more than a system composed by an exclusive hardware.

Further, the program for reproducing a recording medium may be stored in a recording medium. Thus, not only the program installed in a device but also the medium can be distributed.

Embodiment 1

An optical disc changer as a recording medium reproducing device according to a first embodiment of the present invention will be explained with reference to FIGS. 1 to 4. The optical disc changer 1 can receive a plurality of optical discs as recording media such as CD, DVD or the like and selectively reproduce an arbitrary disc among the discs. Further, the optical disc changer 1 can reproduce not only normal CD, DVD format data but also MP3, WMA format data. As shown in FIG. 1, the optical disc changer 1 includes: a disc motor 2; an optical pickup 3; an RF amplifier 4; a servo signal processing unit 5; a driver 6; an audio/video signal processing unit 7; a D/A converter 8; audio/video outputs 9; a microcomputer 10; a disc changer unit 12; and an operating unit 13.

The disc motor 2 rotates an optical disc 11 set on the optical disc changer 1, and composed of a spindle motor and the like.

The optical pickup 3 as the readout unit includes: a not-shown laser diode for generating the light beam irradiating the optical disc 11; an objective lens for irradiating the optical disc 11 with the laser beam from the laser diode; an actuator for driving the objective lens for focusing or tracking in response to an instruction of the servo signal processing unit 5; and a photo-receiver for receiving a reflection reflected from the optical disc 11. The optical pickup 3 generates and outputs an RF signal including tracks of audio and visual as the contents recorded on the optical disc 11 from an output of the photo-receiver, and various control signals such as a focus error signal generated from intensity of the reflection or the like. The content indicates a unit of such as a track, a chapter, a file, a music, or a program of audio and video.

The RF amplifier 4 amplifies a signal inputted from the optical pickup 3 to a specific value, and outputs to the servo signal processing unit 5.

The servo signal processing unit 5 controls the focusing and the tracking by driving the objective lens of the optical pickup 3 based on the control signal such as the focus error signal inputted from the RF amplifier 4, allows the data recorded on the optical disc 11 to be read correctly, and judges the type of the optical disc 11 as a physical medium. Further, the servo signal processing unit 5 analog/digital converts the signal recorded on the optical disc 11 including audio and video and outputs to the audio/video signal processing unit 7.

The driver 6 amplifies the signal inputted from the servo signal processing unit 5, and outputs to the disc motor 2 and the optical pickup 3.

The audio/video signal processing unit 7 as the reproducing unit corrects errors of the inputted signal from the servo signal processing unit 5, and demodulates the signal, then outputs the demodulated management data of the optical disc 11 to the microcomputer 10, and outputs the demodulated audio/video signal to the D/A converter 8.

The D/A converter 8 converts the digital signal inputted from the audio/video signal processing unit 7 to the analog signal, and outputs from the audio output 9*a* and the video output 9*b*.

The microcomputer 10 as the selecting unit and the control unit includes CPU (Central Processing Unit), RAM (Random Access Memory), and ROM (Read Only Memory), and controls the disc changer unit 12 and the optical disc changer 1 totally in actions of normal reproducing, random reproducing, stop or the like, and decides a group to be reproduced based on a condition set by the later-described operating unit.

The disc changer unit 12 can receive a plurality of optical discs 11 of various types such as CD, DVD. The disc changer unit 12 loads the received optical disc 11 to the reproducing position, and receives the optical disc 11 from the reproducing position to an inside of the disc changer unit 12 in response to a control of the microcomputer 10.

The operating unit 13 as the condition setting unit includes buttons for allowing a user to reproduce the optical disc changer 1, to reproduce randomly, and to stop, and includes an LCD (Liquid Crystal Display) for displaying the condition of the optical disc changer 1. Further, the operating unit 13 can set the condition of the groups to be reproduced.

Figure 2:
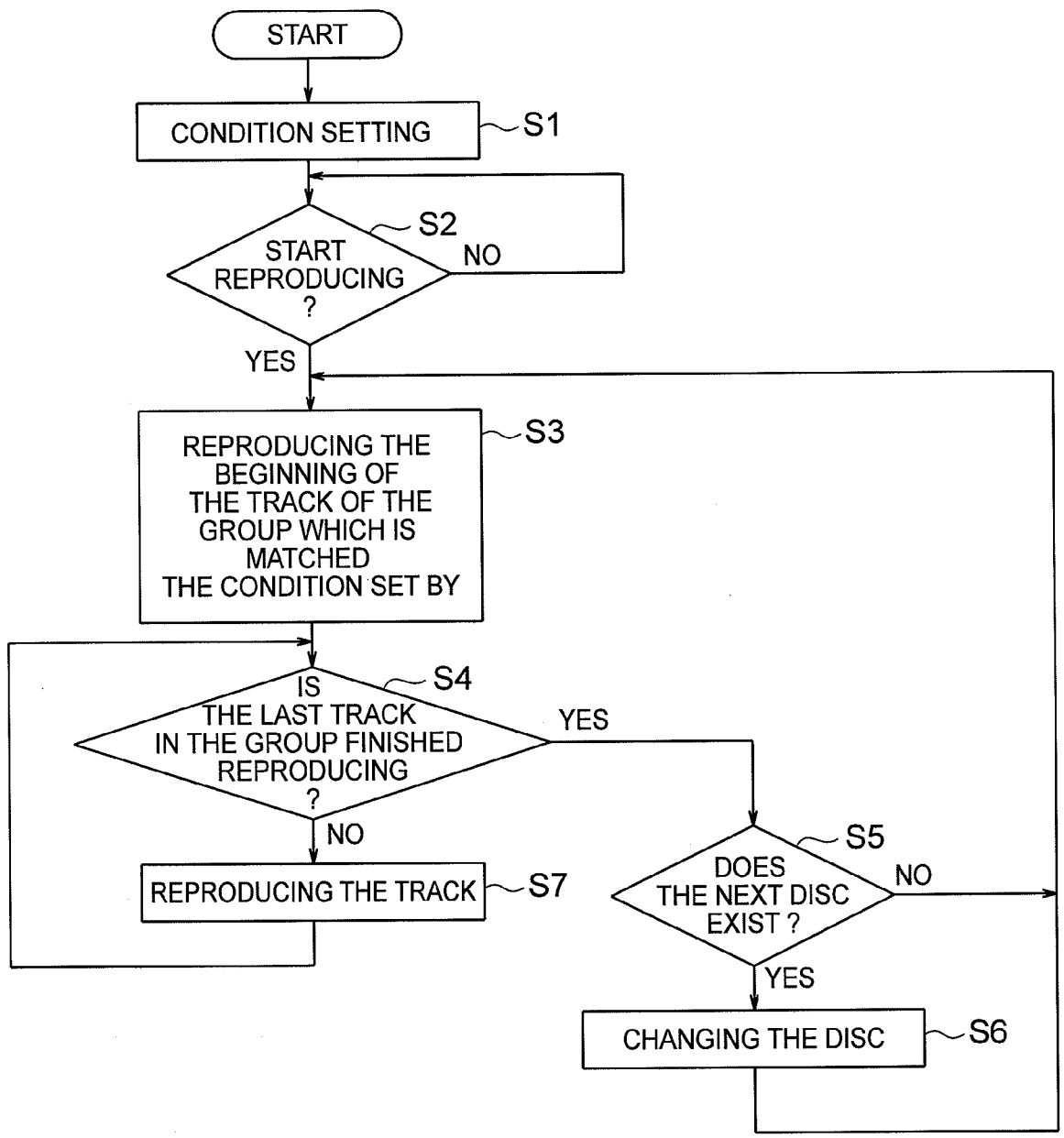
FIG. 2 A flowchart showing a reproducing operation of a specific group in the optical disc changer shown in FIG. 1.

Next, in the optical disc changer 1 having a structure shown in FIG. 1, an operation of reproducing DVD on which groups having a plurality of tracks are recorded will be explained with reference to a flowchart shown in FIG. 2. The flowchart shown in FIG. 2 is realized by the CPU of the microcomputer 10 executing the control program stored in the ROM of the microcomputer 10. The group indicates a set or a class including at least one content (track) generated in the recording medium.

Figure 3:
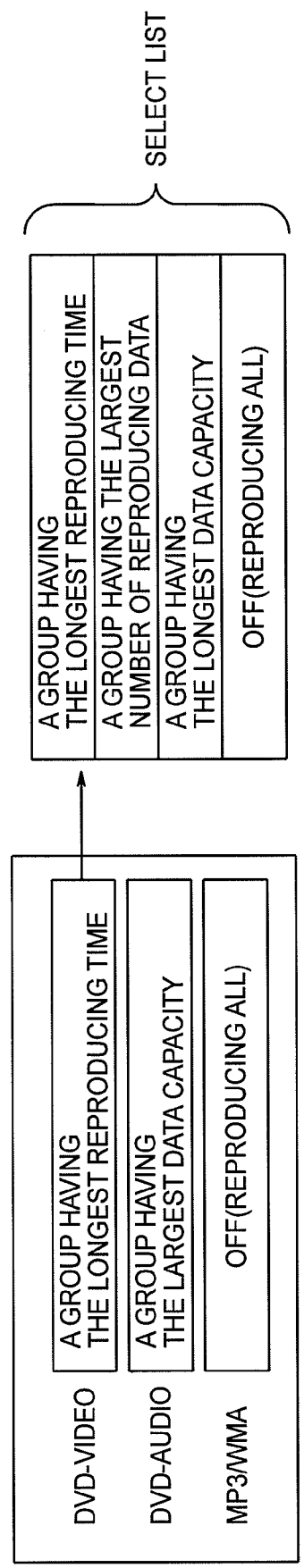
FIG. 3 An explanatory view of a condition selecting screen.

Firstly, in step S1, a user or the like selects the condition of the group which the user wants to be reproduced with the operating unit 13, then, the flow goes to step S2. The condition of the group is, for example, set by selecting while displaying a screen such as FIG. 3 on a display part of the operating unit 13. In FIG. 3, in each of DVD-Video, DVD-Audio, MP3/WMA, the group may be previously set from among the group having the longest reproducing time, the group having the largest number of tracks to be reproduced, the group having the largest data capacity, and OFF (all to be reproduced). The condition set by is sent to the microcomputer 10 from the operating unit 13, and stored in the RAM of the microcomputer 10. Namely, the condition of reproducing the group from among the groups is set.

Next, in step S2, whether an instruction from the operating unit 13 to start reproducing is provided or not is judged. When the instruction to start reproducing is provided ("Yes" in step S2), a lead-off optical disc 11 is selected from the disc changer unit 12, and loaded to the reproducing position where the optical disc 11 is rotated by the disc motor 2, and the data is read out by the optical pickup 3. Then, the flow goes to step S3. When the instruction is not provided ("NO" in step S2), the judgement is performed again.

Next, in step S3, the lead-off track of the group which matches the condition set in the step S1 is reproduced, and the flow goes to step S4. How to discriminate the group which matches the condition is described below. The management data in which the reproducing time and the number of tracks of the tracks or the groups are recorded is read out from the optical disc 11. The management data is stored in the RAM of the microcomputer 10 from the optical pickup 3 via the RF amplifier 4, the servo signal processing unit 5, and the audio/video signal processing unit 7. Then, from the management data stored in the RAM, the reproducing time, the number of tracks, and the data capacity are calculated, and the group which matches the condition set by stored in the RAM is reproduced. Namely, from among a plurality of groups, the group which matches the condition set by is selected and reproduced.

For example, when the optical disc 11 to be reproduced is DVD-Audio, and the contents are recorded as shown in FIG. 4, namely, when the same titled contents are recorded on group 1 and group 2, and the numbers of the channels are different, and when the condition is set as shown in FIG. 3, the group having the largest data capacity of six channels is selected, thereby the track 1 of the group 2 (the lead-off content) is reproduced.

Next, in step S4, whether the last track (the last content) of the group which is reproduced in step S3 is finished or not is judged. When the last track is finished reproducing ("YES" in step S4), the flow goes to step S5. If not ("NO" in step S4), the flow goes to step S7.

Next, in step S5, whether the next optical disc 11 exists in the disc changer unit 12 or not is judged. When the next optical disc 11 exists ("YES" in step S5), the flow goes to step S6. If not ("NO" in step S5), the flow goes back to step S3. The next optical disc 11 indicates the optical disc 11 other than the optical disc 11 which is reproduced now, and is not limited to the optical disc 11 stored in the next position of the optical disc 11 which is reproduced now. When the flow goes back to the step S3, the group which is reproduced will be reproduced again (reproducing repeatedly).

Next, in step S6, the disc changer unit 12 changes the optical disc 11, and the flow goes back to step S3. Namely, the reproduced optical disc 11 is returned to a previously stored part of the disc changer unit 12, and the next optical disc 11 is selected, and loaded to the reproducing position where the optical disc 11 is rotated and allowed the optical pickup 3 to read out the data. Namely, the group to be reproduced is selected and reproduced based on the condition with regard to the other recording medium.

In step S7, next track in the selected group is reproduced, and the flow goes back to step S4.

According to this embodiment, in the optical disc changer 1 which can receive a plurality of optical discs having various types such as CD, DVD, the condition of the group to be reproduced is previously set by the operating unit 13. The microcomputer 10 decides the group to be reproduced based on the reproducing time, the number of tracks, and the data capacity, derived from the management are of the optical disc 11 to be reproduced read out by the optical pickup 3. Then, the microcomputer 10 instructs the servo signal processing unit 5 to read out by the optical pickup 3, and the audio/video signal processing unit 7 reproduces the optical disc 11. Thus, for example, if the contents having the same title or the same song and different number of channels are exist, either one content can solely be reproduced. Thus, it is avoided that the same tile or the same song is reproduced more than once, and the contents which are not needed to be reproduced are reproduced even if the DVD producer mistakes.

Further, when the reproducing of the group is finished, the next disc is searched. When the next disc exists, the group of the next disc which matches the condition set by is reproduced. When the next disc does not exist, the reproduced group is reproduced again, thereby if the reproducing of the group is finished, the reproducing is continued without displaying the menu screen.

Incidentally, in the embodiment described above, DVD-Audio is explained, however, this embodiment is applicable to DVD-Video. In the DVD-Video, contents are recorded in a manner shown in FIGS. 5 and 6. Namely, contents are divided to the titles as the groups including more than one chapter. Using the condition set in FIG. 3, the microcomputer 10 judges whether each title matches the condition, and the title which matches the condition is reproduced. For example, in FIG. 5, when a movie is recorded on the DVD-Video, if the group having the longest reproducing time is set, the title 1 is reproduced. In FIG. 6, when the music is recorded on the DVD-Video, if the group having the largest number of chapters is set, the title 1 is reproduced.

Further, when MP3 or WMA is recorded on the CD, as shown in FIG. 7, if the tracks and the songs as the contents are included in a folder as a group, the present invention is applicable.

Further, in the embodiment described above, components other than the microcomputer 10 are configured by the hardware. However, all the components other than the disc motor 2, the optical pickup 3, the RF amplifier 4, the driver 6, and the analog movement components of the D/A converter 8 may be configured by a program executed on the microcomputer 10. Thus, software components are increased, and general versatility is increased when the optical disc changer 1 is transplanted to other device.

Further, in the embodiment described above, priority may be established with regard to the conditions set by. Thus, for example, when the group having the largest number of tracks is selected, and a plurality of groups matches the condition, the other high-priority condition (the longest reproducing time, the largest data capacity) is selected.

Further, the present invention is not limited to the optical disc, but other recording medium using a hard disc or a semiconductor memory on which a plurality of groups (titles, folders) including at least one content (track, chapter, file) are recorded.

According to the embodiment described above, a recording medium reproducing device, a method for reproducing a recording medium, a program for reproducing a recording medium are attained.

(Note 1) a optical disc changer 1 including:

a optical pickup 3 for reading out recorded tracks from a optical disc 11 on which a plurality of groups in each of which at least one track is included are recorded;

a audio/video signal processing unit 7 for reproducing the tracks which are read out by the optical pickup 3;

a operating unit 13 for setting a condition for reproducing a group having the largest data capacity in the optical disc 11;

a microcomputer 10 for selecting the group which matches the condition set by the operating unit 13 from among the groups;

the microcomputer 10 to make the optical pickup 3 read out the group selected by the microcomputer 10 and to make the audio/video signal processing unit 7 reproducing the group.

According to the optical disc changer 1, because only the group having the largest data capacity in the optical disc 11 which matches the predetermined condition set by a user is reproduced, it is avoided that the same track is reproduced more than once, and the tracks which are not needed to be reproduced are reproduced.

(Note 2) A method for reproducing an optical disc for reading out and reproducing a recorded track from an optical disc 11 on which a plurality of groups in each of which at least one track is included are recorded, said method including the steps of:

setting the condition for reproducing one group having the largest data capacity in the optical disc 11 from among a plurality of groups;

selecting the group which matches the condition from among a plurality of groups;

reading out the group; and reproducing the group.

According to the method for reproducing an optical disc, because only the group having the largest data capacity in the recording medium which matches the predetermined condition set by a user is reproduced, it is avoided that the same track is reproduced more than once, and the tracks which are not needed to be reproduced are reproduced.

(Note 3) A program for reproducing an optical disc to make a computer of a reproducing device for a recording medium having a optical pickup 3 for reading out tracks from an optical disc 11 on which a plurality of groups each of which includes at least one track are recorded work as a audio/video signal processing unit 7 for reproducing the tracks read out by the optical pickup 3, wherein the program makes the computer work including the steps of:

step S1 for setting a condition for reproducing a group having the largest data capacity in the optical disc 11;

step S3 for selecting the group which matches the condition set in the step S1 from among the groups;

step S3 to make the optical pickup 3 read out the group selected in the step S3 and to make the audio/video signal processing unit 7 reproducing the group.

According to the program for reproducing an optical disc, because only the group having the largest data capacity in the optical disc 11 which matches the predetermined condition set by a user is reproduced, it is avoided that the same track is reproduced more than once, and the tracks which are not needed to be reproduced are reproduced.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A recording medium reproducing device comprising:
a readout unit for reading out recorded contents from a recording medium on which a plurality of groups in each of which at least one content is included are recorded;
a reproducing unit for reproducing the contents which are read out by the readout unit;
a condition setting unit for setting a condition for reproducing a group having the largest data capacity among the groups in the recording medium;
a selecting unit for selecting the group which matches the condition set by the setting unit from among the groups;
a control unit to make the readout unit read out the group selected by the selecting unit and to make the reproducing unit reproduce the group,
wherein at least one of said groups has contents including the same title as at least one other of said groups.

2. The recording medium reproducing device as claimed in claim 1,
wherein the readout unit reads out the contents from an arbitrary selected recording medium from among a plurality of recording media.

3. The recording medium reproducing device as claimed in claim 2,
wherein after the control unit makes the reproducing unit reproduce an end of the group selected by the selecting unit, the control unit makes the readout unit read out another recording medium, then, makes the selecting unit select the group based on the condition set by the condition setting unit, then, makes the readout unit read out the group selected by the selecting unit, and then makes the reproducing unit reproduce the group.

4. The recording medium reproducing device as claimed in any one of claims 1 or 2,
wherein after the control unit makes the reproducing unit reproduce an end of the group selected by the selecting unit, the control unit makes the reproducing unit reproduce again the reproduced group.

5. A method for reproducing a recording medium with a laser for reading out and reproducing a recorded content from a recording medium on which a plurality of groups in each of which at least one content is included are recorded, said method including the steps of:
setting the condition for reproducing one group having the largest data capacity from among the plurality of groups, wherein at least one of said groups has contents including the same title as at least one other of said groups;
selecting the group which matches the condition from among the plurality of groups;
reading out the group; and
reproducing the group.

6. A non-transitory computer-readable medium having encoded thereon a program which causes a computer of a reproducing device to execute a content reproducing method for reproducing a recording medium, the reproducing device having a readout unit for reading out contents from the recording medium on which a plurality of groups each of which includes at least one content are recorded work as a reproducing unit for reproducing the contents read out by the readout unit,
wherein the program causes the computer to work as:
a condition setting unit for setting a condition for reproducing a group having the largest data capacity in the recording medium from among the plurality of groups, wherein at least one of said groups has contents including the same title as at least one other of said groups;
a selecting unit for selecting the group which matches the condition set by the setting unit from among the groups;
a control unit to make the readout unit read out the group selected by the selecting unit and to make the reproducing unit reproduce the group.

7. A non-transitory computer-readable medium as claimed in claim 6, wherein the program for reproducing a recording medium causes the computer to perform the content reproducing method, the content reproducing method comprising:
setting the condition for reproducing one group having the largest data capacity from among a plurality of groups, wherein at least one of said groups has contents including the same title as at least one other of said groups;
selecting the group which matches the condition from among the plurality of groups;
reading out the group; and
reproducing the group.

8. The recording medium reproducing device as claimed in claim 1, wherein each group of the plurality of groups is a bundle of content which is separate from other bundles of content of the other groups of the plurality of groups.

9. The recording medium reproducing device as claimed in claim 1, wherein only the group from among the plurality of groups selected by the selecting unit is reproduced by the reproducing unit.

10. The recording medium reproducing device as claimed in claim 1, wherein unselected groups of the plurality of groups which are not selected by the selecting unit are excluded from being reproduced by the reproducing unit such that the same title is not reproduced more than once.

11. The method for reproducing a recording medium of claim 5, wherein each group of the plurality of groups is a bundle of content which is separate from other bundles of content of the other groups of the plurality of groups.

12. The non-transitory computer-readable recording medium of claim 6, wherein each group of the plurality of groups is a bundle of content which is separate from other bundles of content of the other groups of the plurality of groups.

* * * * *